(12) United States Patent
Shiraishi et al.

(10) Patent No.: US 8,011,806 B2
(45) Date of Patent: Sep. 6, 2011

(54) LIGHTING FIXTURE USING STRIP-SHAPED LUMINOUS BODY

(75) Inventors: Kazuya Shiraishi, Tokyo (JP); Hiroto Anzai, Tokyo (JP); Nao Nakano, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 309 days.

(21) Appl. No.: 12/356,626

(22) Filed: Jan. 21, 2009

(65) Prior Publication Data

US 2009/0190351 A1  Jul. 30, 2009

(30) Foreign Application Priority Data

Jan. 23, 2008 (JP) .................. 2008-012746

(51) Int. Cl.
*F21S 4/00* (2006.01)
*F21V 21/00* (2006.01)

(52) U.S. Cl. ......... 362/249.08; 362/249.04; 362/249.06; 362/249.14

(58) Field of Classification Search .......... 362/543–545, 362/551, 249.01–249.04, 249.07, 249.08, 362/218, 249.06, 249.11, 249.14
See application file for complete search history.

(56) References Cited

U.S. PATENT DOCUMENTS 7,086,756 B2 * 8/2006 Maxik .................. 362/249.04
7,585,090 B2 * 9/2009 Wu ........................ 362/249.02

FOREIGN PATENT DOCUMENTS

JP 2005-347144 A 12/2005
JP 2006-216455 A 8/2006

\* cited by examiner

*Primary Examiner* — Thomas M Sember
(74) *Attorney, Agent, or Firm* — Holtz, Holtz, Goodman & Chick, PC (57) ABSTRACT

According to a lighting fixture of an aspect of the present invention, only by holding the first and second strip-shaped luminous bodies on the strip-shaped luminous body holding device with the first and second strip-shaped luminous bodies being curved into a predetermined shape, the plurality of point light sources of the first strip-shaped luminous body and the plurality of point light sources of the second strip-shaped luminous body can be mounted at predetermined positions in appropriate postures (for example, such positions and postures as to illuminate a predetermined area of the front of the lighting fixture) at once. That is, each of the point light sources can be stereoscopically disposed at a predetermined position in an appropriate posture in a most expeditious manner. Also, the lighting fixture of novel visual quality capable of producing a stereoscopic effect by the real image can be provided.

16 Claims, 9 Drawing Sheets

DEVELOPED SHAPE

FIG.4B

ATTACHMENT STATE

FIG.5

VIEWED FROM FRONT OF LIGHTING FIXTURE

DEVELOPED SHAPE

ATTACHMENT STATE

FIG.8A

DEVELOPED SHAPE

FIG.8B

ATTACHMENT STATE

FIG.9A

DEVELOPED SHAPE

FIG.9B

ATTACHMENT STATE

LIGHTING FIXTURE USING STRIP-SHAPED LUMINOUS BODY

BACKGROUND OF THE INVENTION

1. Field of the Invention

The present invention relates to a lighting fixture using a strip-shaped luminous body, and more particularly, to a lighting fixture of novel visual quality capable of producing a stereoscopic effect by a real image.

2. Description of the Related Art

Recently, in the field of lighting fixtures (especially in the field of vehicle lighting fixtures, from the perspective of improving the degree of freedom of vehicle design or the like), a lighting fixture of novel visual quality has been demanded. As such a lighting fixture, for example, Japanese Patent Application Laid-Open Nos. 2005-347144 and 2006-216455 propose a lighting fixture which produces a stereoscopic effect by a virtual image by devising a lens shape or a reflecting surface of a reflector. Also, a plurality of point light sources such as LEDs may be stereoscopically disposed, so as to produce a stereoscopic effect by the real image.

SUMMARY OF THE INVENTION

In the case of stereoscopically disposing a plurality of point light sources such as LEDs and producing a stereoscopic effect by the real image, the stereoscopic effect can be emphasized in comparison with the case of using a virtual image. However, each of the plurality of point light sources such as LEDs needs to be mounted at a predetermined position in an appropriate posture. Thus, there is such a problem that a large number of man-hours and a large amount of time are required for assembling a lighting fixture.

The present invention has been made in view of such circumstances, and it is an object of the present invention to provide a lighting fixture of novel visual quality capable of stereoscopically disposing each of a plurality of point light sources at a predetermined position in an appropriate posture in a most expeditious manner and producing a stereoscopic effect by a real image.

In order to achieve the above object, the invention according to a first aspect includes: a first strip-shaped luminous body which is a strip-shaped member formed of a material having flexibility and has a plurality of point light sources disposed in a longitudinal direction thereof; a second strip-shaped luminous body which is a strip-shaped member formed of a material having flexibility, and has a plurality of point light sources disposed in a longitudinal direction thereof, and a strip-shaped luminous body holding device which holds the first strip-shaped luminous body on a near side as viewed from the front of a lighting fixture with the first strip-shaped luminous body being curved into a predetermined shape, and holds the second strip-shaped luminous body on a far side as viewed from the front of the lighting fixture with the second strip-shaped luminous body being curved into a predetermined shape.

With the invention according to the first aspect, only by holding the first and second strip-shaped luminous bodies on the strip-shaped luminous body holding device with the first and second strip-shaped luminous bodies being curved into a predetermined shape, the plurality of point light sources of the first strip-shaped luminous body and the plurality of point light sources of the second strip-shaped luminous body can be mounted at predetermined positions in appropriate postures (for example, such positions and postures as to illuminate a predetermined area of the front of the lighting fixture) at once.

That is, each of the point light sources can be stereoscopically disposed at a predetermined position in an appropriate posture in a most expeditious manner. Also, the lighting fixture of novel visual quality capable of producing a stereoscopic effect by the real image can be provided.

The invention according to a second aspect provides the invention according to the first aspect, wherein the strip-shaped luminous body holding device includes a first strip-shaped luminous body fixing curve which is a curved surface disposed on the near side as viewed from the front of the lighting fixture, and to which the first strip-shaped luminous body is fixed, and a second strip-shaped luminous body fixing curve which is a curved surface disposed on the far side as viewed from the front of the lighting fixture, and to which the second strip-shaped luminous body is fixed.

With the invention according to the second aspect, the plurality of point light sources of the first strip-shaped luminous body and the plurality of point light sources of the second strip-shaped luminous body can be mounted at predetermined positions in appropriate postures (for example, such positions and postures as to illuminate a predetermined area of the front of the lighting fixture) along the first strip-shaped luminous body fixing curve and the second strip-shaped luminous body fixing curve at once.

The invention according to a third aspect provides the invention according to the second aspect, wherein the first strip-shaped luminous body is wound and fixed on the first strip-shaped luminous body fixing curve with a surface on an opposite side from a surface on which the plurality of point light sources are disposed being in substantial surface contact with the first strip-shaped luminous body fixing curve, and the second strip-shaped luminous body is wound and fixed on the second strip-shaped luminous body fixing curve with a surface on a side on which the plurality of point light sources are disposed being in substantial surface contact with the second strip-shaped luminous body fixing curve.

With the invention according to the third aspect, by winding and fixing the first and second strip-shaped luminous bodies on the first and second strip-shaped luminous body fixing curves, the plurality of point light sources of the first strip-shaped luminous body and the plurality of point light sources of the second strip-shaped luminous body can be mounted at predetermined positions in appropriate postures (for example, such positions and postures as to illuminate a predetermined area of the front of the lighting fixture) along the first and second strip-shaped luminous body fixing curves at once.

The invention according to a fourth aspect provides the invention according to the third aspect, wherein openings into which the plurality of point light sources of the second strip-shaped luminous body wound on the second strip-shaped luminous body attaching surface are inserted are formed in the second strip-shaped luminous body fixing curve.

With the invention according to the fourth aspect, even if the point light sources of the second strip-shaped luminous body project from the surface of the second strip-shaped luminous body, the plurality of point light sources of the second strip-shaped luminous body can be mounted at predetermined positions in appropriate postures (for example, such positions and postures as to illuminate a predetermined area of the front of the lighting fixture) at once since the projecting point light sources are inserted into the openings of the second strip-shaped luminous body fixing curve.

The invention according to a Fifth aspect provides the invention according to the third or fourth aspect, wherein the strip-shaped luminous body holding device includes a bracket, the first strip-shaped luminous body fixing curve and the second strip-shaped luminous body fixing curve are provided on an outer periphery of the bracket, and the bracket, the first strip-shaped luminous body fixing curve and the second strip-shaped luminous body fixing curve are formed of a transparent or semi-transparent material.

With the invention according to the fifth aspect, by winding and fixing the first and second strip-shaped luminous bodies on the bracket (the first and second strip-shaped luminous body fixing curves formed on the outer periphery of the bracket), the plurality of point light sources of the first strip-shaped luminous body and the plurality of point light sources of the second strip-shaped luminous body can be mounted at predetermined positions in appropriate postures (for example, such positions and postures as to illuminate a predetermined area of the front of the lighting fixture) along the first and second strip-shaped luminous body fixing curves at once.

The invention according to a sixth aspect provides the invention according to the fifth aspect, wherein the first strip-shaped luminous body fixing curve and the second strip-shaped luminous body fixing curve are formed in a spiral shape on an outer peripheral surface of the bracket.

With the invention according to the sixth aspect, the first and second strip-shaped luminous bodies can be wound in a spiral shape on the bracket (the first and second strip-shaped luminous body fixing curves formed on the outer periphery of the bracket). Therefore, the first and second strip-shaped luminous bodies can be mounted on the bracket in a most expeditious manner. Also, the lighting fixture of novel visual quality capable of producing a stereoscopic effect by the point light sources (real image) which are stereoscopically disposed in a spiral shape as viewed from the front of the lighting fixture can be provided.

The invention according to a seventh aspect provides the invention according to the fifth or sixth aspect, wherein the first strip-shaped luminous body and the second strip-shaped luminous body are a linear strip-shaped luminous body in which one end of the first strip-shaped luminous body and one end of the second strip-shaped luminous body are continuous with each other, and the plurality of point light sources of the second strip-shaped luminous body are disposed on a surface on an opposite side from a surface on which the plurality of point light sources of the first strip-shaped luminous body are disposed.

With the invention according to the seventh aspect, the first and second strip-shaped luminous bodies are the continuous linear strip-shaped luminous body, and the plurality of point light sources of the second strip-shaped luminous body are disposed on the surface on the opposite side from the surface on which the plurality of point light sources of the first strip-shaped luminous body are disposed. Therefore, the first and second strip-shaped luminous bodies can be wound in a spiral shape on the bracket (the first and second strip-shaped luminous body fixing curves formed on the outer periphery of the bracket) without reversing the strip-shaped luminous body by "twisting" a strip-shaped portion between the first and second strip-shaped luminous bodies.

The invention according to an eighth aspect provides the invention according to any one of the third to sixth aspects wherein the first strip-shaped luminous body fixing curve and the second strip-shaped luminous body fixing curve are designed such that the plurality of point light sources of the first strip-shaped luminous body and the plurality of point light sources of the second strip-shaped luminous body are in such postures as to illuminate a predetermined area when the first strip-shaped luminous body and the second strip-shaped luminous body are wound and fixed on the first strip-shaped luminous body fixing curve and the second strip-shaped luminous body fixing curve.

With the invention according to the eighth aspect, by designing the first and second strip-shaped luminous body fixing curves such that each point light source is at such a position and in such a posture as to illuminate a desired area, the plurality of point light sources of the first strip-shaped luminous body and the plurality of point light sources of the second strip-shaped luminous body can be mounted at desired positions in desired postures (for example, such positions and postures as to illuminate a predetermined area of the front of the lighting fixture) along the first and second strip-shaped luminous body fixing curves at once.

The invention according to a ninth aspect provides the invention according to any one of the first to eighth aspects, wherein a light guide rod which extends in a vertical direction as viewed from the front of the lighting fixture is disposed between the first strip-shaped luminous body and the second strip-shaped luminous body.

With the invention according to the ninth aspect, the light guide rod which extends in the vertical direction as viewed from the front of the lighting fixture is disposed between the first and second strip-shaped luminous bodies. Therefore, the lighting fixture of novel visual quality capable of further emphasizing the stereoscopic effect by the point light sources (real image) which are stereoscopically disposed in a spiral shape as viewed from the front of the lighting fixture can be provided.

The invention according to a tenth aspect provides the invention according to any one of the fourth to ninth aspects, wherein a first bracket disposed on the near side as viewed from the front of the lighting fixture and a second bracket disposed on the far side as viewed from the front of the lighting fixture are combined to constitute the bracket.

With the invention according to the tenth aspect, the first bracket disposed on the near side as viewed from the front of the lighting fixture and the second bracket disposed on the far side as viewed from the front of the lighting fixture are combined to constitute the bracket. Therefore, the light guide rod can be mounted on the first bracket or second bracket very easily.

The invention according to an eleventh aspect provides the invention according to any one of the first to tenth aspects, wherein the strip-shaped member is a flexible substrate.

The flexible substrate is only an example of the strip-shaped member. The present invention is not limited thereto, and another flexible material may be used as the strip-shaped member, for example.

According to the present invention, the lighting fixture of novel visual quality capable of stereoscopically disposing each of the plurality of point light sources at a predetermined position in an appropriate posture in a most expeditious manner, and producing a stereoscopic effect by the real image can be provided.

DETAILED DESCRIPTION OF THE PREFERRED EMBODIMENTS

In the following, an embodiment in which a lighting fixture of the present invention is applied to a vehicle lighting fixture such as a tail lamp of a vehicle such as an automobile will be described with reference to the drawings.

Figure 1:
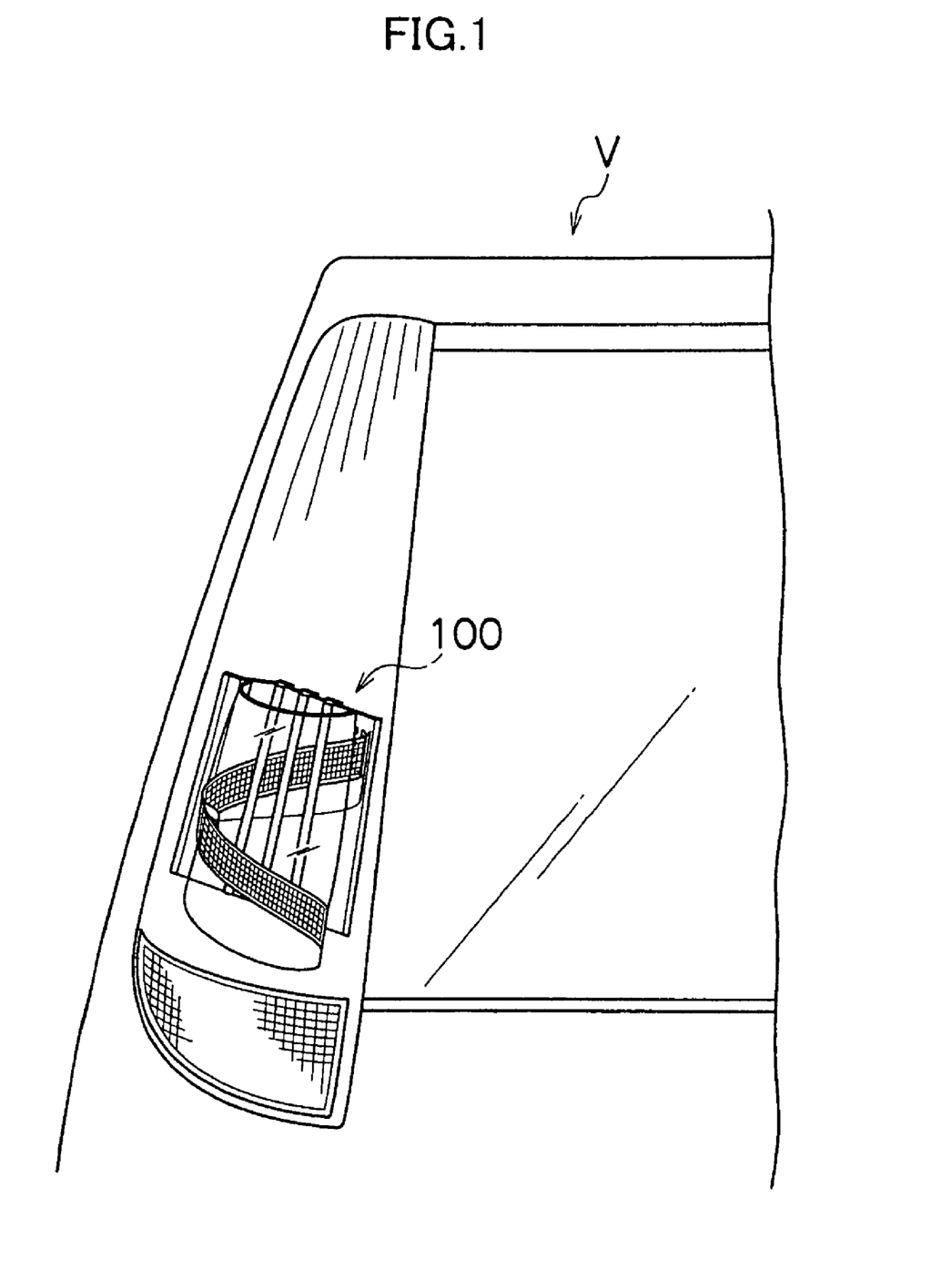
FIG. 1 is a rear view of a vehicle to which a vehicle lighting fixture 100 that is a lighting fixture of the present invention is applied (a front view of the vehicle lighting fixture 100 when attention is focused on the vehicle lighting fixture 100)
Figure 2:
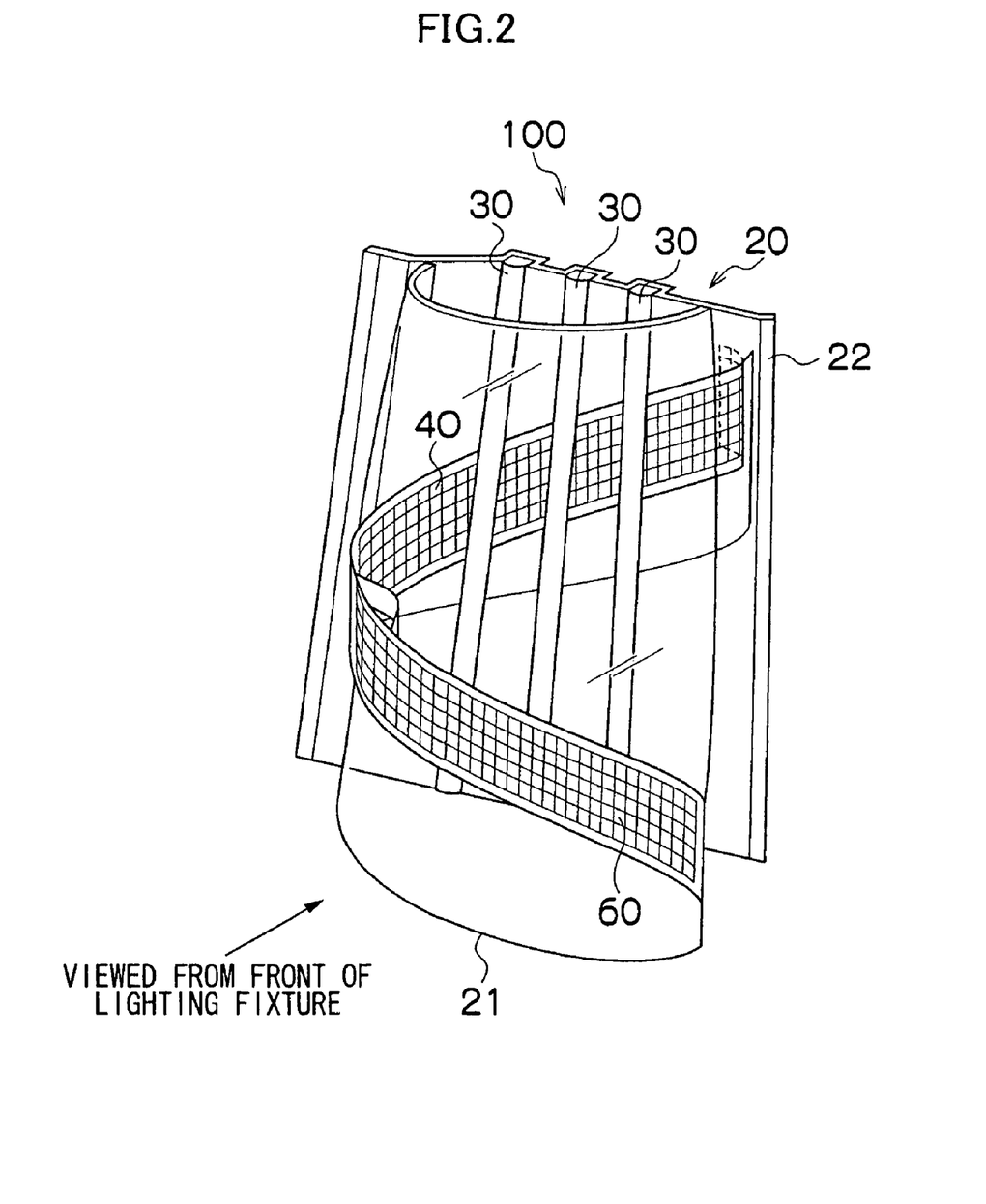
FIG. 2 is a view for explaining the configuration of a vehicle lighting fixture 100 according to a present embodiment.
Figure 3:
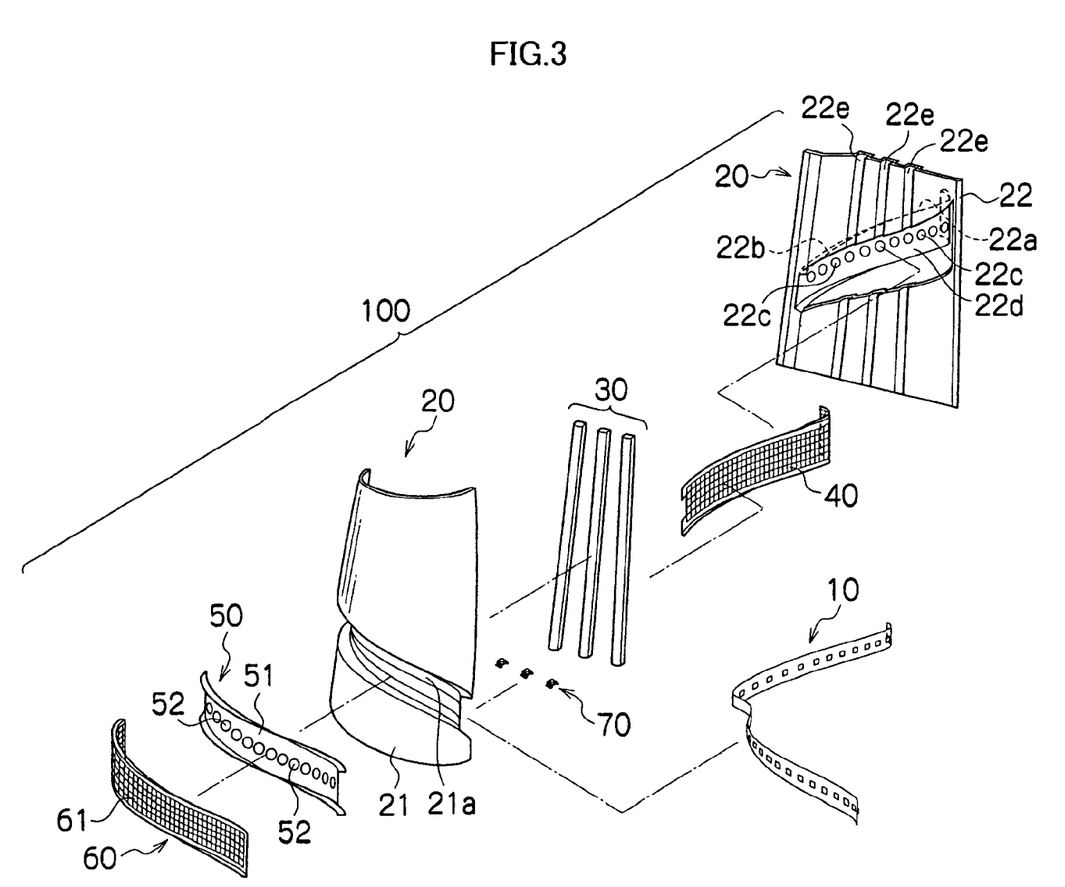
FIG. 3 is an assembly view of the vehicle lighting fixture 100 according to the present embodiment.

FIG. 1 is a rear view of a vehicle to which a vehicle lighting fixture 100 that is the lighting fixture of the present invention is applied (a front view of the vehicle lighting fixture 100 when attention is focused on the vehicle lighting fixture 100). FIG. 2 is a view for explaining the configuration of the vehicle lighting fixture 100 according to the present embodiment. FIG. 3 is an assembly view of the vehicle lighting fixture 100 according to the present embodiment.

As shown in FIG. 1 the vehicle lighting fixture 100 of the present embodiment is applied to a vehicle lighting fixture such as a tail lamp of a vehicle V such as an automobile. The vehicle lighting fixture 100 includes a strip-shaped luminous body 10, a bracket 20 which holds the strip-shaped luminous body 10 with the strip-shaped luminous body 10 being curved into a predetermined shape, light guide rods 30, a far side inner lens 40, an extension 50, a near side inner lens 60 or the like as shown in FIGS. 2 and 3.

Figure 4A:
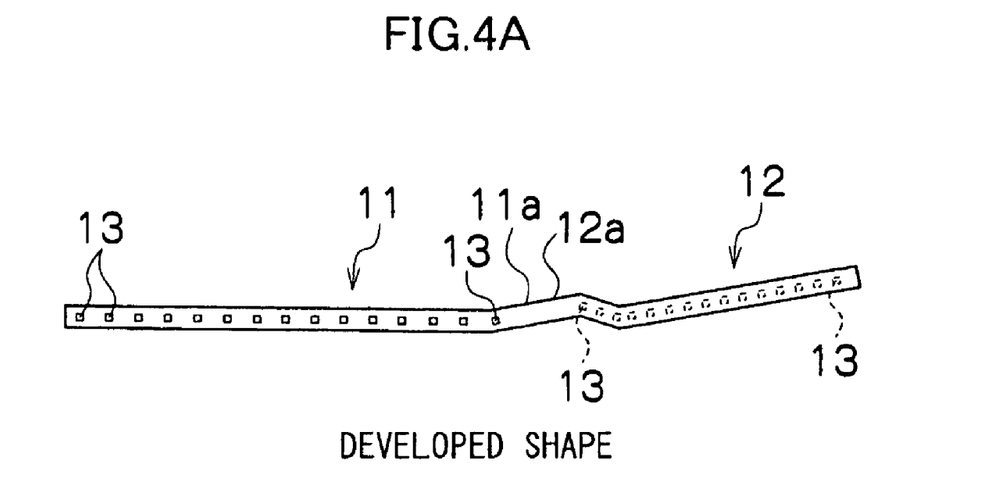
FIGS. 4A and 4B are views for explaining an example of a strip-shaped luminous body 10 used for the vehicle lighting fixture 100 according to the present embodiment.
Figure 4B:
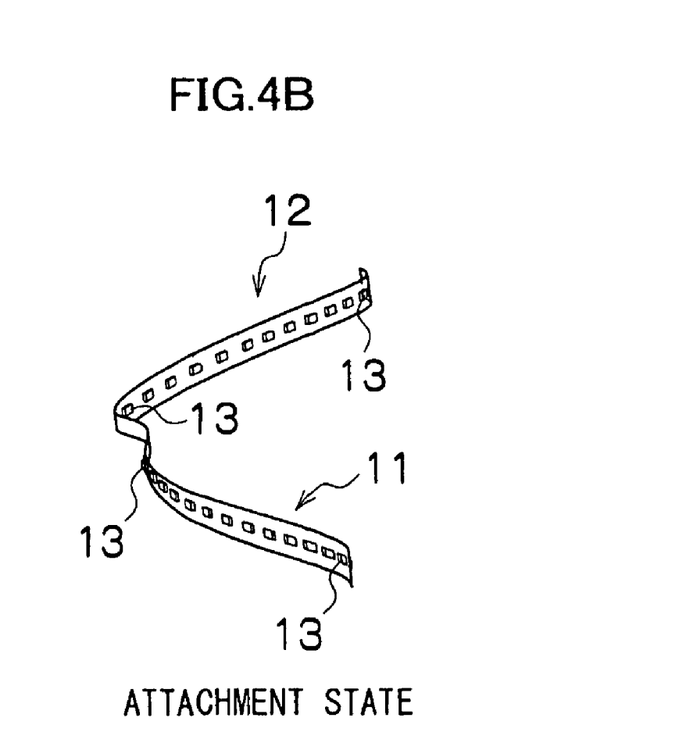

FIGS. 4A and 4B are views for explaining an example of the strip-shaped luminous body 10 used for the vehicle lighting fixture 100 according to the present embodiment.

As shown in FIGS. 4A and 4B, the strip-shaped luminous body 10 is a strip-shaped member which is formed of a material having flexibility such as a flexible substrate, and includes a first strip-shaped luminous body 11 and a second strip-shaped luminous body 12 both having a plurality of point light sources 13 such as LED packages disposed in the longitudinal direction. One end 11a of the first strip-shaped luminous body 11 and one end 12a of the second strip-shaped luminous body 12 are continuous with each other, and the strip-shaped luminous body 10 has a substantially linear shape (see FIG. 4A). The plurality of point light sources 13 may be disposed at regular or irregular intervals.

The plurality of point light sources 13 of the second strip-shaped luminous body 12 are disposed on a surface on the opposite side from a surface on which the plurality of point light sources 13 of the first strip-shaped luminous body 11 are disposed (both surface mounting). Therefore, the strip-shaped luminous body 10 can be wound in a spiral shape on the outer periphery of the bracket 20 as described below without reversing the strip-shaped luminous body by "twisting" a strip-shaped portion between the first strip-shaped luminous body 11 and the second strip-shaped luminous body 12 (see FIG. 4B).

Figure 5:
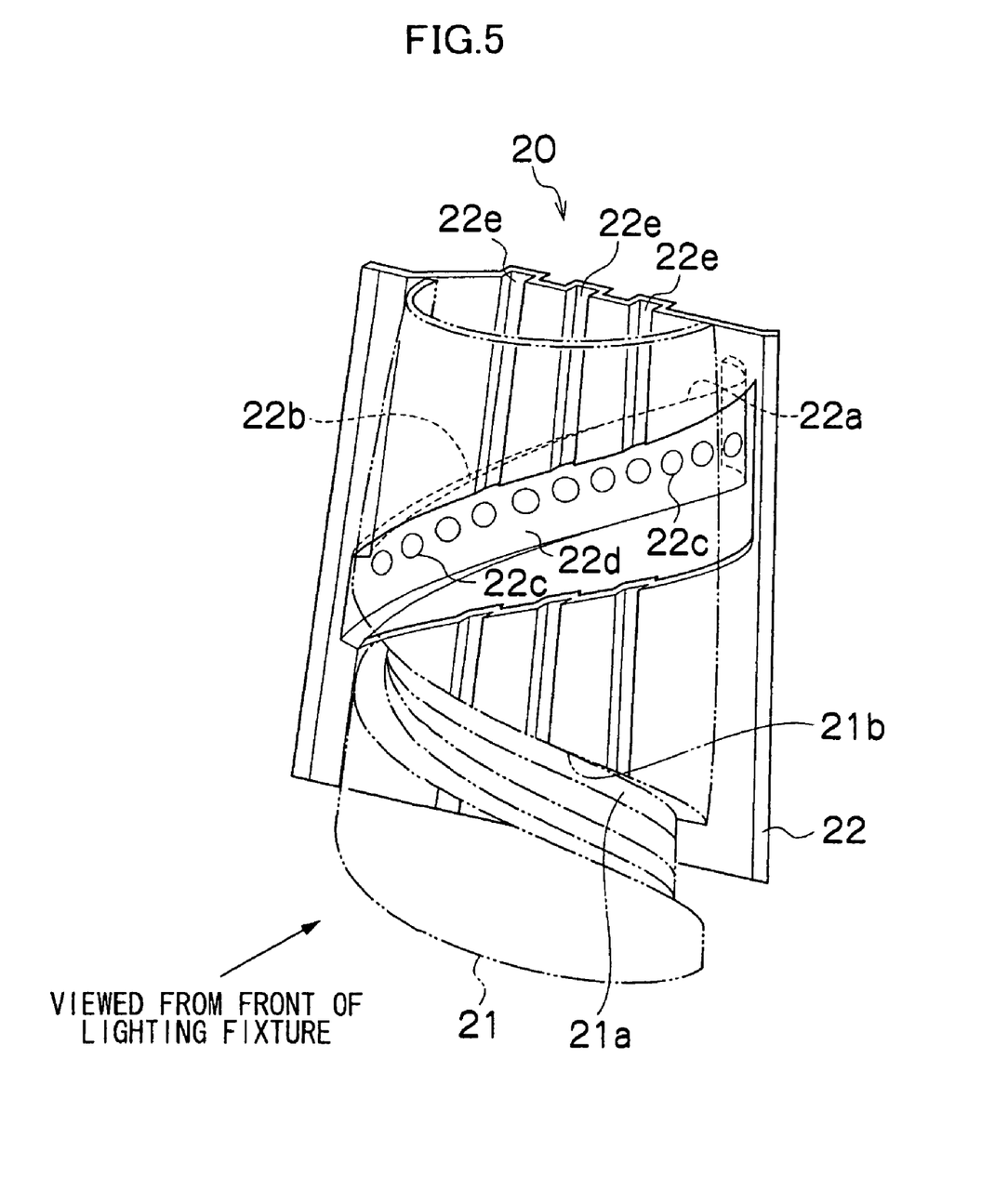
FIG. 5 is a view for explaining strip-shaped luminous body fixing curves 21a and 22a formed on the outer periphery of a bracket 20.

FIG. 5 is a view for explaining strip-shaped luminous body fixing curves 21a and 22a formed on the outer periphery of the bracket 20.

As shown in FIGS. 3 and 5, the bracket 20 includes a first bracket 21 and a second bracket 22 formed of a transparent or semi-transparent synthetic resin material or the like.

The first bracket 21 is disposed on the near side as viewed from the front of the lighting fixture, and has a first convex curved surface 21a (the bottom surface of an inner lens attachment groove 21b formed in the first bracket 21 is illustrated in FIGS. 3 and 5) which bulges toward the near side from the far side as viewed from the front of the lighting fixture and extends in a spiral shape as viewed from the front of the lighting fixture. The second bracket 22 is disposed on the far side as viewed from the front of the lighting fixture, and has a second convex curved surface 22a (the bottom surface of an inner lens attachment groove 22b is illustrated in FIGS. 3 and 5) which bulges toward the far side from the near side as viewed from the front of the lighting fixture and extends in a spiral shape as viewed from the back of the lighting fixture. By combining the first bracket 21 and the second bracket 22 as shown in FIG. 5, the strip-shaped luminous body fixing curves 21a and 22a in which the first convex curved surface 21a and the second convex curved surface 22a are substantially continuous with each other and which extend in a spiral shape are formed on the outer periphery of the bracket 20.

Figure 6:
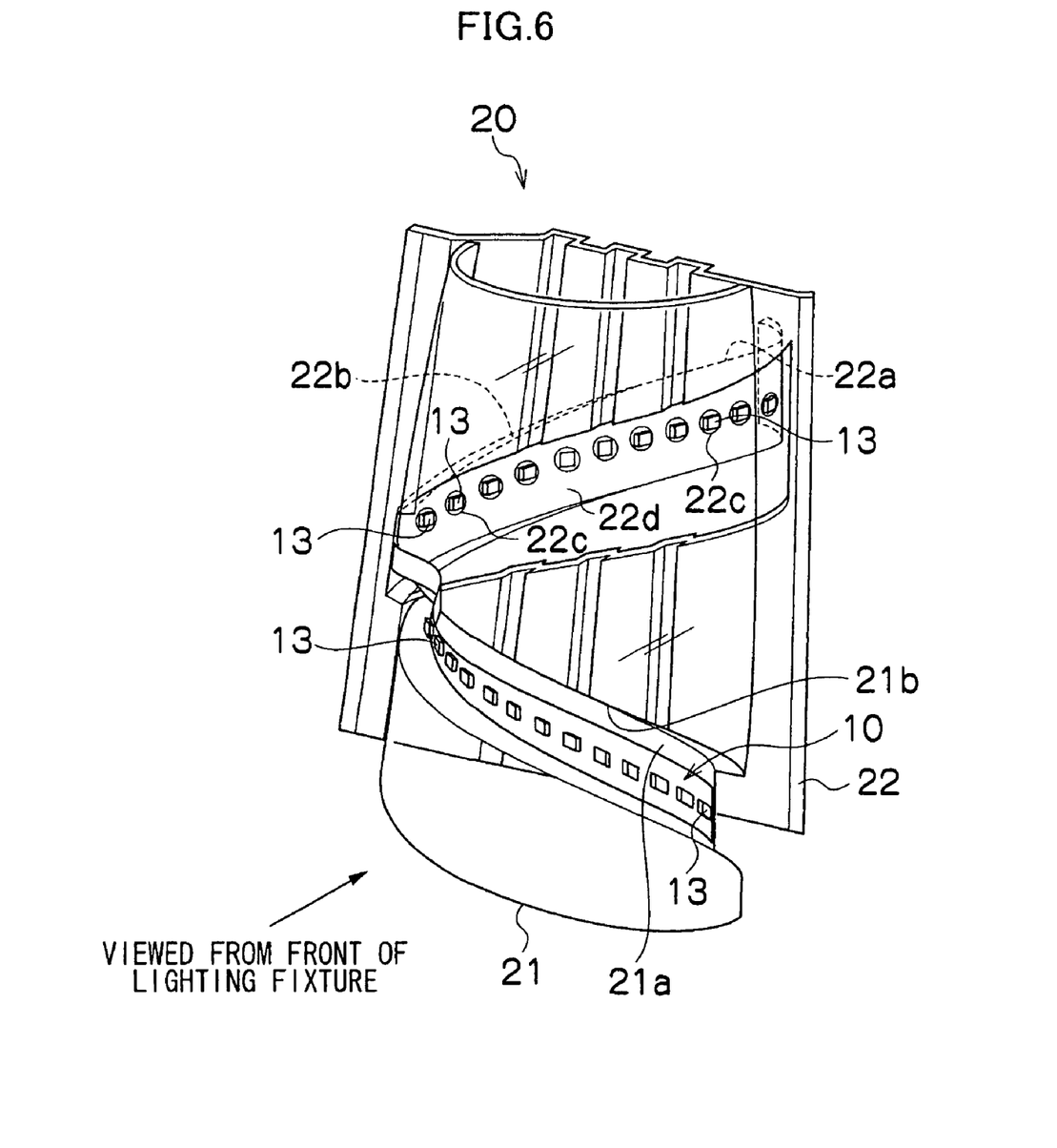
FIG. 6 is a view for explaining a state in which a strip-shaped luminous body 10 is wound on strip-shaped luminous body fixing curves 21a and 22a formed on the outer periphery of a bracket 20.

FIG. 6 is a view for explaining a state in which the strip-shaped luminous body 10 is wound on the strip-shaped luminous body fixing curves 21a and 22a formed on the outer periphery of the bracket 20.

As shown in FIG. 6, the strip-shaped luminous body 10 is wound in a spiral shape on the strip-shaped luminous body fixing curves 21a and 22a, and is fixed thereto by a known fixing device such as an adhesive, screw, thermal caulking or the like. Since the first and second strip-shaped luminous bodies are wound in a spiral shape, the first and second strip-shaped luminous bodies 11 and 12 can be mounted on the bracket 20 in a most expeditious manner.

The first strip-shaped luminous body 11 is wound and fixed on the first convex curved surface 21a on the near side as viewed from the front of the lighting fixture with a surface on the opposite side from the surface on which the plurality of point light sources 13 are disposed being in substantial surface contact with the first convex curved surface 21a.

The first convex curved surface 21a is designed such that each of the point light sources 13 of the first strip-shaped luminous body 11 wound and fixed on the first convex curved surface 21a is at such a position and in such a posture as to illuminate a desired area. Therefore, only by winding and fixing the first strip-shaped luminous body 11 on the first convex curved surface 21a, the plurality of point light sources 13 can be mounted at desired positions in desired postures (for example, such positions and postures as to illuminate a predetermined area of the front of the lighting fixture) along the first convex curved surface 21a at once.

The extension 50 having a surface 51 (in which a plurality of openings 52 into which the plurality of point light sources 13 of the first strip-shaped luminous body 11 are inserted are formed) to which mirror surface processing by aluminum deposition or the like is given is mounted in the inner lens attachment groove 21b alter the first strip-shaped luminous body 11 is wound and fixed on the first convex curved surface 21a. Furthermore, the inner lens 60 having a surface 61 to which predetermined processing such as cutting or the like is given is mounted so as to cover the extension 50.

A plurality of openings 22c into which the plurality of point light sources 13 of the second strip-shaped luminous body 12 are inserted are formed in the second convex curved surface 22a on the far side as viewed from the front of the lighting fixture. The second strip-shaped luminous body 12 is wound and fixed on the second convex curved surface 22a with the plurality of point light sources 13 being inserted into the plurality of openings 22c and the surface on which the plurality of point light sources 13 are disposed being in substantial surface contact with the second convex curved surface 22a. the plurality of openings 22c are formed in the second convex curved surface 22a. Therefore, even if the point light sources 13 of the second strip-shaped luminous body 12 project from the surface of the second strip-shaped luminous body 12 (in a case where LED packages are mounted on the surface of a flexible substrate), the plurality of point light sources 13 of the second strip-shaped luminous body 12 can be mounted at predetermined positions in appropriate postures (for example, such positions and postures as to illuminate a predetermined area of the front of the lighting fixture) at once since the projecting point light sources 13 are inserted into the openings 22c of the second convex curved surface 22a.

The second convex curved surface 22a is designed such that each of the point light sources 13 of the second strip-shaped luminous body 12 wound and fixed on the second convex curved surface 22a is at such a position and in such a posture as to illuminate a desired area. Therefore, only by winding and fixing the second strip-shaped luminous body 12 on the second convex curved surface 22a, the plurality of point light sources 13 can be mounted at desired positions in desired postures (for example, such positions and postures as to illuminate a predetermined area of the front of the lighting fixture) along the second convex curved surface 22a at once.

The plurality of point light sources 13 of the second strip-shaped luminous body 12 are disposed on the surface on the opposite side from the surface on which the plurality of point light sources 13 of the first strip-shaped luminous body 11 are disposed. Therefore, the strip-shaped luminous body 10 can be wound without reversing the strip-shaped luminous body by "twisting" the strip-shaped portion between the first strip-shaped luminous body 11 and the second strip-shaped luminous body 12.

A concave curved surface 22d, which bulges toward the far side from the near side as viewed from the front of the lighting fixture and to which minor surface processing by aluminum deposition or the like is given, is formed on the opposite side from the second convex curved surface 22a. The inner lens 40 having a surface 41 to which predetermined processing such as cutting or the like is given is mounted on the concave curved surface 22d.

As described above, according to the vehicle lighting fixture 100 of the present embodiment, the strip-shaped luminous body 10 is wound and fixed in a spiral shape on the strip-shaped luminous body fixing curves 21a and 22a formed on the outer periphery of the bracket 20. Accordingly, the first strip-shaped luminous body 11 is disposed on the near side as viewed from the front of the lighting fixture (moreover, the plurality of point light sources 13 of the first strip-shaped luminous body 11 are stereoscopically disposed along the first convex curved surface 21a), and the second strip-shaped luminous body 12 is disposed on the far side as viewed from the front of the lighting fixture (moreover, the plurality of point light sources 13 of the second strip-shaped luminous body 12 are stereoscopically disposed along the second convex curved surface 22a).

That is, according to the vehicle lighting fixture 100 of the present embodiment, by winding and fixing the first strip-shaped luminous body 11 and the second strip-shaped luminous body 12 on the first convex curved surface 21a and the second convex curved surface 22a, the plurality of point light sources 13 of the first strip-shaped luminous body 11 and the plurality of point light sources 13 of the second strip-shaped luminous body 12 can be mounted at predetermined positions in appropriate postures (for example, such positions and postures as to illuminate a predetermined area of the front of the lighting fixture) along the first and second convex curved surfaces 21a and 22a at once.

Therefore, when the vehicle lighting fixture 100 is viewed from the front, the first strip-shaped luminous body 11 and the second strip-shaped luminous body 12 can be visually recognized in a stereoscopic manner. That is, according to the vehicle lighting fixture 100 of the present embodiment, it is possible to provide the vehicle lighting fixture 100 of novel visual quality capable of producing a stereoscopic effect by the plurality of point light sources 13 (real image) which are stereoscopically disposed.

In the present embodiment, in order to further emphasize the stereoscopic effect by the point light sources 13 (real image) which are stereoscopically disposed, a light guide rod 30 (three light guide rods 30 are illustrated in FIGS. 2, 3 or the like) which extends in the vertical direction as viewed from the front of the lighting fixture is disposed between the first strip-shaped luminous body 11 and the second strip-shaped luminous body 12 as shown in FIG. 2.

Light emitted from a light source 70 such as an LED package or the like that is disposed on one end (or both ends) of the light guide rod 30 enters the light guide rod 30 and is internally reflected, so that the light guide rod 30 emits light. The light guide rod 30 is fixed in a state in which the light guide rod 30 is inserted and positioned in a groove 22e which is formed in a surface on the opposite side from the surface on which the second convex curved surface 22a of the second bracket 22 is formed and extends in the vertical direction as shown in FIG. 5, for example. Therefore, even when the vehicle V shakes, the position of the light guide rod 30 is not displaced. Also, the bracket 20 is divided into the first bracket 21 and the second bracket 22, and the both brackets are combined to constitute the bracket 20. Therefore, the light guide rod 30 can be mounted on the second bracket 22 (or the first bracket 21) very easily.

As described above, since the light guide rod 30 extending in the vertical direction as viewed from the front of the lighting fixture is disposed between the first strip-shaped luminous body 11 and the second strip-shaped luminous body 12, it is possible to provide the vehicle lighting fixture 100 of novel visual quality capable of further emphasizing the stereoscopic effect by the point light sources 13 (real image) which are stereoscopically disposed in a spiral shape as viewed from the front of the lighting fixture.

Next, a method of assembling the vehicle lighting fixture 100 having the above configuration will be described with reference to FIG. 3.

First, the inner lens 40 is mounted on the second bracket 22 (the concave curved surface 22d on the opposite side from the second convex curved surface 22a).

Subsequently, the light guide rods 30 are mounted in the grooves 22e of the second bracket 22 (the grooves 22e which are formed in the surface on the opposite side from the surface on which the second convex curved surface 22a is formed and extend in the vertical direction). The second bracket 22 on which the light guide rods 30 are mounted is combined with the first bracket 21. Accordingly the strip-shaped luminous body fixing curves 21a and 22a in which the first convex curved surface 21a and the second convex curved surface 22a are substantially continuous with each other and which extend in a spiral shape are formed on the outer periphery of the bracket 20.

The strip-shaped luminous body 10 is then wound in a spiral shape on the strip-shaped luminous body fixing curves 21a and 22a formed on the outer peripheral surface of the bracket 20, and is fixed thereto by a known fixing device such as an adhesive, screw, thermal caulking or the like. The extension 50 is mounted in the inner lens attachment groove 21b. Furthermore, the inner lens 60 is mounted so as to cover the extension 50. The assembly of the vehicle lighting fixture 100 shown in FIG. 2 is completed in the aforementioned manner.

As described above, according to the vehicle lighting fixture 100 of the present embodiment, only by holding (winding and fixing) the first strip-shaped luminous body 11 and the second strip-shaped luminous body 12 on the bracket 20 that is a strip-shaped luminous body holding device with the first and second strip-shaped luminous bodies 11 and 12 being curved into a predetermined shape, the plurality of point light sources 13 of the first strip-shaped luminous body 11 and the plurality of point light sources 13 of the second strip-shaped luminous body 12 can be mounted at predetermined positions in appropriate postures (for example, such positions and postures as to illuminate a predetermined area of the front of the lighting fixture) at once. That is, each of the point light sources can be stereoscopically disposed at a predetermined position in an appropriate posture in a most expeditious manner. Also, the vehicle lighting fixture 100 of novel visual quality capable of producing a stereoscopic effect by the point light sources 13 (real image) which are stereoscopically disposed as described above can be provided.

Next, modifications will be described.

Although the example in which two strip-shaped luminous bodies of the first strip-shaped luminous body 11 and the second strip-shaped luminous body 12 are used is described in the aforementioned embodiment, the present invention is not limited to this configuration. For example, three or more strip-shaped luminous bodies such as a third strip-shaped luminous body may be used to constitute the lighting body of the present invention (in this case, the spiral shown in FIG. 2 further extends in the vertical direction).

Also, it is described that the surfaces to which the first strip-shaped luminous body 11 and the second strip-shaped luminous body 12 are fixed are the strip-shaped luminous body fixing curves 21a and 22a in which the first convex curved surface 21a and the second convex curved surface 22a are substantially continuous with each other and which extend in a spiral shape in the aforementioned embodiment. However, the present invention is not limited to this configuration. For example, the first and second convex curved surfaces 21a and 22a may be disposed substantially in parallel with each other as viewed from the front of the lighting fixture.

Figure 7A:
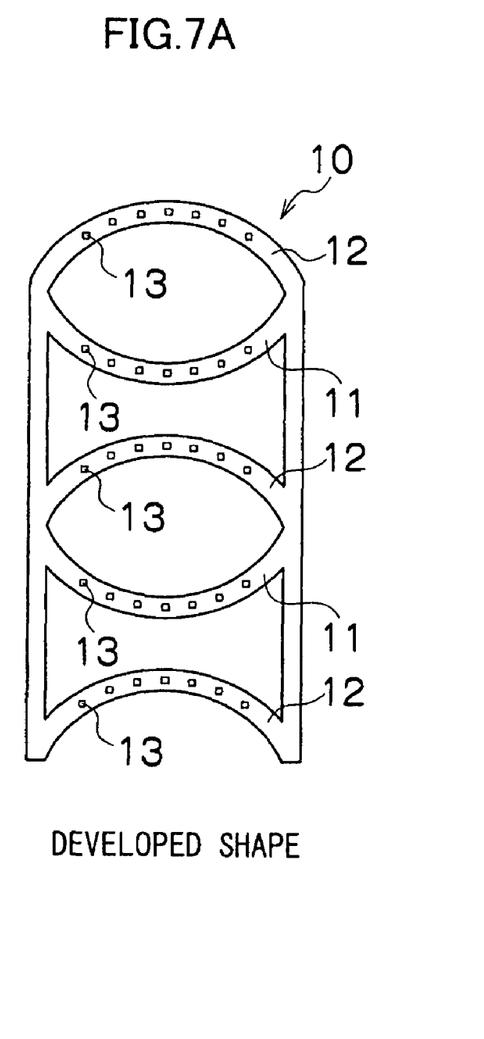
FIGS. 7A and 7B are views for showing a modification of a strip-shaped luminous body 10.
Figure 7B:
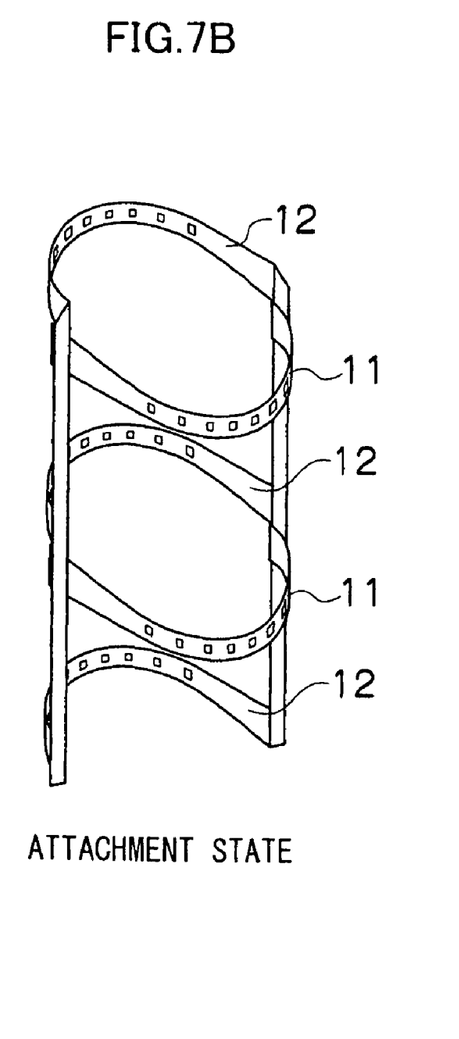
Figure 8A:
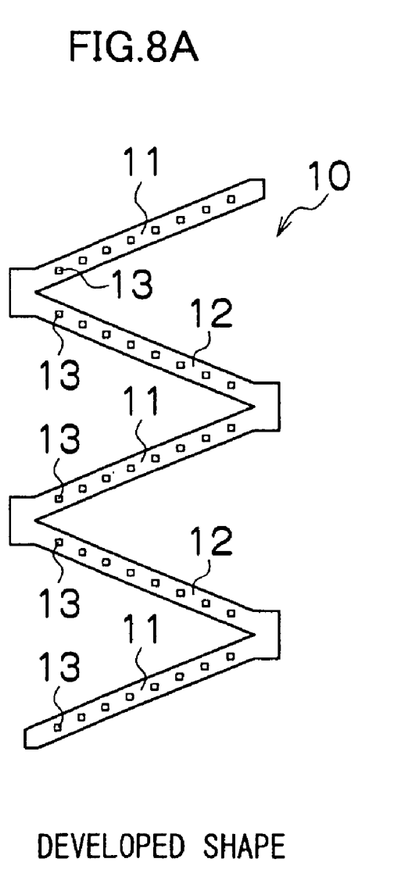
FIGS. 8A and 8B are views for showing a modification of a strip-shaped luminous body 10.
Figure 8B:
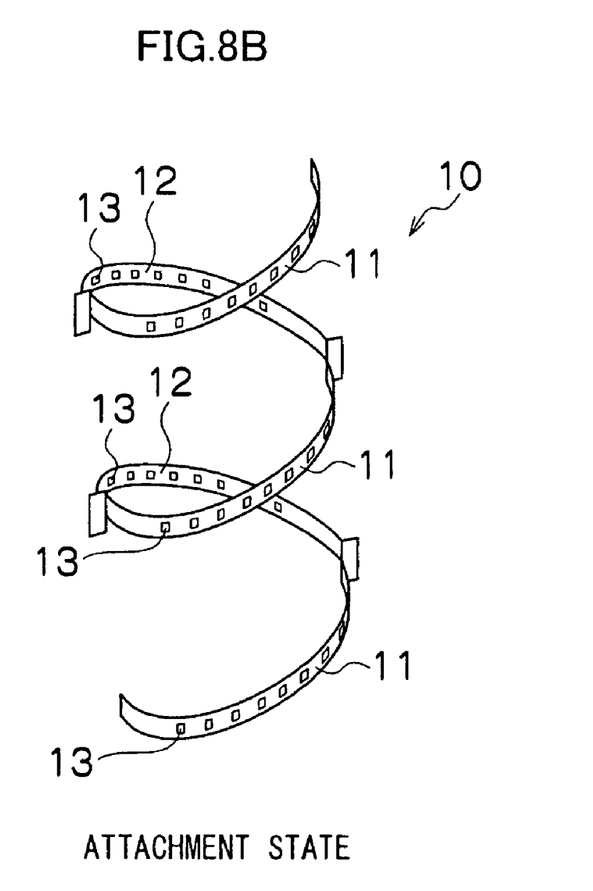
Figure 9A:
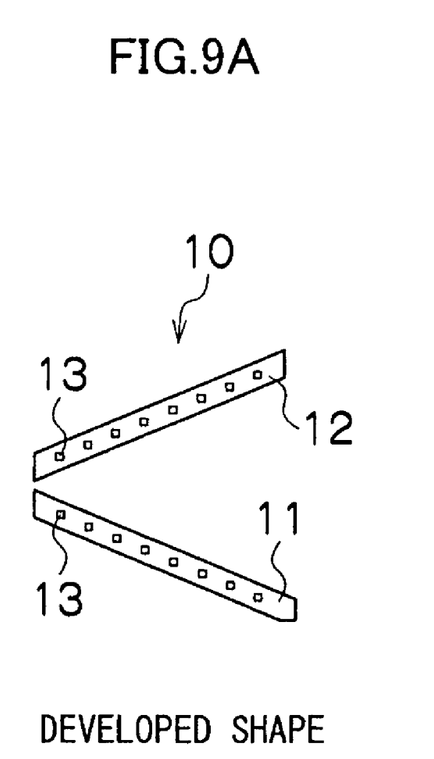
FIGS. 9A and 9B are views for showing a modification of a strip-shaped luminous body 10.
Figure 9B:
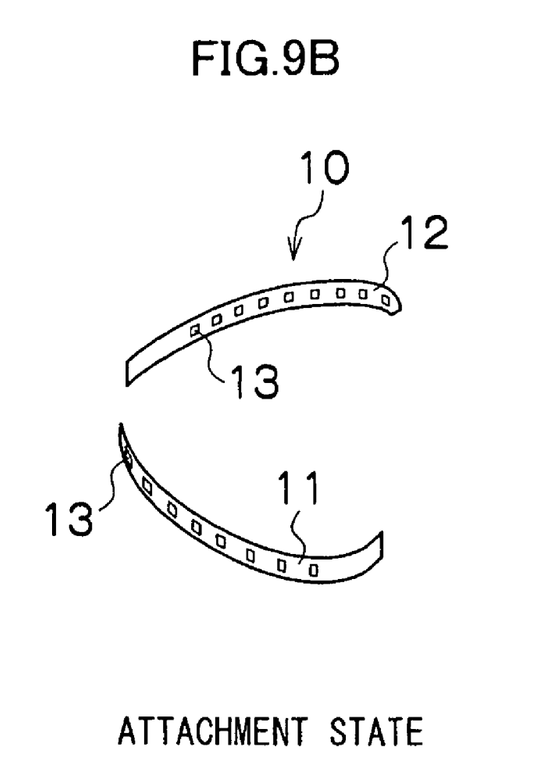

Also, it is described that the one end 11a of the first strip-shaped luminous body 11 and the one end 12a of the second strip-shaped luminous body 12 are continuous with each others and the strip-shaped luminous body 10 has a substantially linear shape in the aforementioned embodiment. However, the present invention is not limited to this configuration. For example, the strip-shaped luminous body 10 may have a ring shape in which the both end portions of the first strip-shaped luminous body 11 are respectively continuous with the both end portions of the second strip-shaped luminous body 12 as shown in FIGS. 7A and 7B. Alternatively, as shown in FIGS. 8A and 8B, the strip-shaped luminous body 10 may have a shape in which the first and second strip-shaped luminous bodies 11 and 12 are continuous with each other in each end portion so as to form a predetermined angle therebetween. Also, as shown in FIGS. 9A and 9B, the strip-shaped luminous body 10 may have the first strip-shaped luminous body 11 and the second strip-shaped luminous body 12 separately from the first strip-shaped luminous body 11. In this case, the first and second strip-shaped luminous bodies 11 and 12 may be connected to each other by a jumper or the like.

Also, the example in which the lighting fixture of the present invention is constituted by the strip-shaped luminous body 10, the bracket 20, the light guide rod 30, the far side inner lens 40, the extension 50, and the near side inner lens 60 is described in the aforementioned embodiment. However, the present invention is not limited to this configuration. These components may be appropriately combined to constitute the lighting fixture of the present invention. For example, only the strip-shaped luminous body 10 and the bracket 20 may constitute the lighting fixture of the present invention. In this case, the bracket 20 may be integrally configured without dividing the bracket 20 into the first bracket 21 and the second bracket 22.

Also, the example in which the lighting fixture of the present invention is applied to the vehicle lighting fixture such as a tail lamp of a vehicle such as an automobile is described in the aforementioned embodiment. However, the present invention is not limited to this configuration. For example, the lighting fixture of the present invention may be applied to an interior decorative light such as an interior light of a vehicle such as an automobile, and a tail lamp of a two-wheeled motor vehicle or the like. Alternatively, the lighting fixture of the present invention may be also applied to a decorative light such as an advertising light, a warning light, a marker light, and a game machine light.

The aforementioned embodiment is described only as an example in every sense, and the present invention should not be limitedly interpreted on the basis of the above description. The present invention may be embodied in various other forms without departing from the spirit and essential features of the invention.

What is claimed is:

1. A lighting fixture using a strip-shaped luminous body comprising:
   a first strip-shaped luminous body which is a strip-shaped member formed of a material having flexibility, and has a plurality of point light sources disposed in a longitudinal direction thereof;
   a second strip-shaped luminous body which is a strip-shaped member formed of a material having flexibility, and has a plurality of point light sources disposed in a longitudinal direction thereof; and
   a strip-shaped luminous body holding device which holds the first strip-shaped luminous body on a near side as viewed from a front of the lighting fixture with the first strip-shaped luminous body being curved into a predetermined shape, and holds the second strip-shaped luminous body on a far side as viewed from the front of the lighting fixture with the second strip-shaped luminous body being curved into a predetermined shape,
   wherein the strip-shaped luminous body holding device comprises:
      a first strip-shaped luminous body fixing curve which is a curved surface disposed on the near side as viewed from the front of the lighting fixture, and to which the first strip-shaped luminous body is fixed; and
      a second strip-shaped luminous body fixing curve which is a curved surface disposed on the far side as viewed from the front of the lighting fixture, and to which the second strip-shaped luminous body is fixed, wherein the first strip-shaped luminous body is wound and fixed on the first strip-shaped luminous body fixing curve with a surface on an opposite side from a surface on which the plurality of point light sources are disposed being in substantial surface contact with the first strip-shaped luminous body fixing curve, and wherein the second strip-shaped luminous body is wound and fixed on the second strip-shaped luminous body fixing curve with a surface on a side on which the plurality of point light sources are disposed being in substantial surface contact with the second strip-shaped luminous body fixing curve.

2. The lighting fixture using the strip-shaped luminous body according to claim 1, wherein openings, into which the plurality of point light sources of the second strip-shaped luminous body wound on the second strip-shaped luminous body fixing curve are inserted, are formed in the second strip-shaped luminous body fixing curve.

3. The lighting fixture using the strip-shaped luminous body according to claim 2, wherein:

the strip-shaped luminous body holding device comprises a bracket, the first strip-shaped luminous body fixing curve and the second strip-shaped luminous body fixing curve are provided on an outer periphery of the bracket, and the bracket, the first strip-shaped luminous body fixing curve, and the second strip-shaped luminous body fixing curve are formed of a transparent or semi-transparent material.

4. The lighting fixture using the strip-shaped luminous body according to claim 3, wherein the first strip-shaped luminous body fixing curve and the second strip-shaped luminous body fixing curve are formed in a spiral shape on an outer peripheral surface of the bracket.

5. The lighting fixture using the strip-shaped luminous body according to claim 4, wherein the first strip-shaped luminous body and the second strip-shaped luminous body are a linear strip-shaped luminous body in which one end of the first strip-shaped luminous body and one end of the second strip-shaped luminous body are continuous with each other, and wherein the plurality of point light sources of the second strip-shaped luminous body are disposed on a surface on an opposite side from a surface on which the plurality of point light sources of the first strip-shaped luminous body are disposed.

6. The lighting fixture using the strip-shaped luminous body according to claim 5, wherein the first strip-shaped luminous body fixing curve and the second strip-shaped luminous body fixing curve are designed such that the plurality of point light sources of the first strip-shaped luminous body and the plurality of point light sources of the second strip-shaped luminous body are in such postures as to illuminate a predetermined area when the first strip-shaped luminous body and the second strip-shaped luminous body are wound and fixed on the first strip-shaped luminous body fixing curve and the second strip-shaped luminous body fixing curve.

7. The lighting fixture using the strip-shaped luminous body according to claim 6, wherein a light guide rod which extends in a vertical direction as viewed from the front of the lighting fixture is disposed between the first strip-shaped luminous body and the second strip-shaped luminous body.

8. The lighting fixture using the strip-shaped luminous body according to claim 7, wherein a first bracket disposed on the near side as viewed from the front of the lighting fixture and a second bracket disposed on the far side as viewed from the front of the lighting fixture are combined to constitute the bracket.

9. The lighting fixture using the strip-shaped luminous body according to claim 8, wherein the strip-shaped member is a flexible substrate.

10. The lighting fixture using the strip-shaped luminous body according to claim 1, wherein:

the strip-shaped luminous body holding device comprises a bracket, the first strip-shaped luminous body fixing curve and the second strip-shaped luminous body fixing curve are provided on an outer periphery of the bracket, and the bracket, the first strip-shaped luminous body fixing curve, and the second strip-shaped luminous body fixing curve are formed of a transparent or semi-transparent material.

11. The lighting fixture using the strip-shaped luminous body according to claim 10, wherein the first strip-shaped luminous body fixing curve and the second strip-shaped luminous body fixing curve are formed in a spiral shape on an outer peripheral surface of the bracket.

12. The lighting fixture using the strip-shaped luminous body according to claim 10, wherein the first strip-shaped luminous body and the second strip-shaped luminous body are a linear strip-shaped luminous body in which one end of the first strip-shaped luminous body and one end of the second strip-shaped luminous body are continuous with each other, and wherein the plurality of point light sources of the second strip-shaped luminous body are disposed on a surface on an opposite side from a surface on which the plurality of point light sources of the first strip-shaped luminous body are disposed.

13. The lighting fixture using the strip-shaped luminous body according to claim 10, wherein a first bracket disposed on the near side as viewed from the front of the lighting fixture and a second bracket disposed on the far side as viewed from the front of the lighting fixture are combined to constitute the bracket.

14. The lighting fixture using the strip-shaped luminous body according to claim 1, wherein the first strip-shaped luminous body fixing curve and the second strip-shaped luminous body fixing curve are designed such that the plurality of point light sources of the first strip-shaped luminous body and the plurality of point light sources of the second strip-shaped luminous body are in such postures as to illuminate a predetermined area when the first strip-shaped luminous body and the second strip-shaped luminous body are wound and fixed on the first strip-shaped luminous body fixing curve and the second strip-shaped luminous body fixing curve.

15. The lighting fixture using the strip-shaped luminous body according to claim 1, wherein a light guide rod which extends in a vertical direction as viewed from the front of the lighting fixture is disposed between the first strip-shaped luminous body and the second strip-shaped luminous body.

16. The lighting fixture using the strip-shaped luminous body according to claim 1, wherein the strip-shaped member is a flexible substrate.

* * * * *